J. R. ROBERTSON.
Vegetable Cutter.
No. 35,839. Patented July 8, 1862.
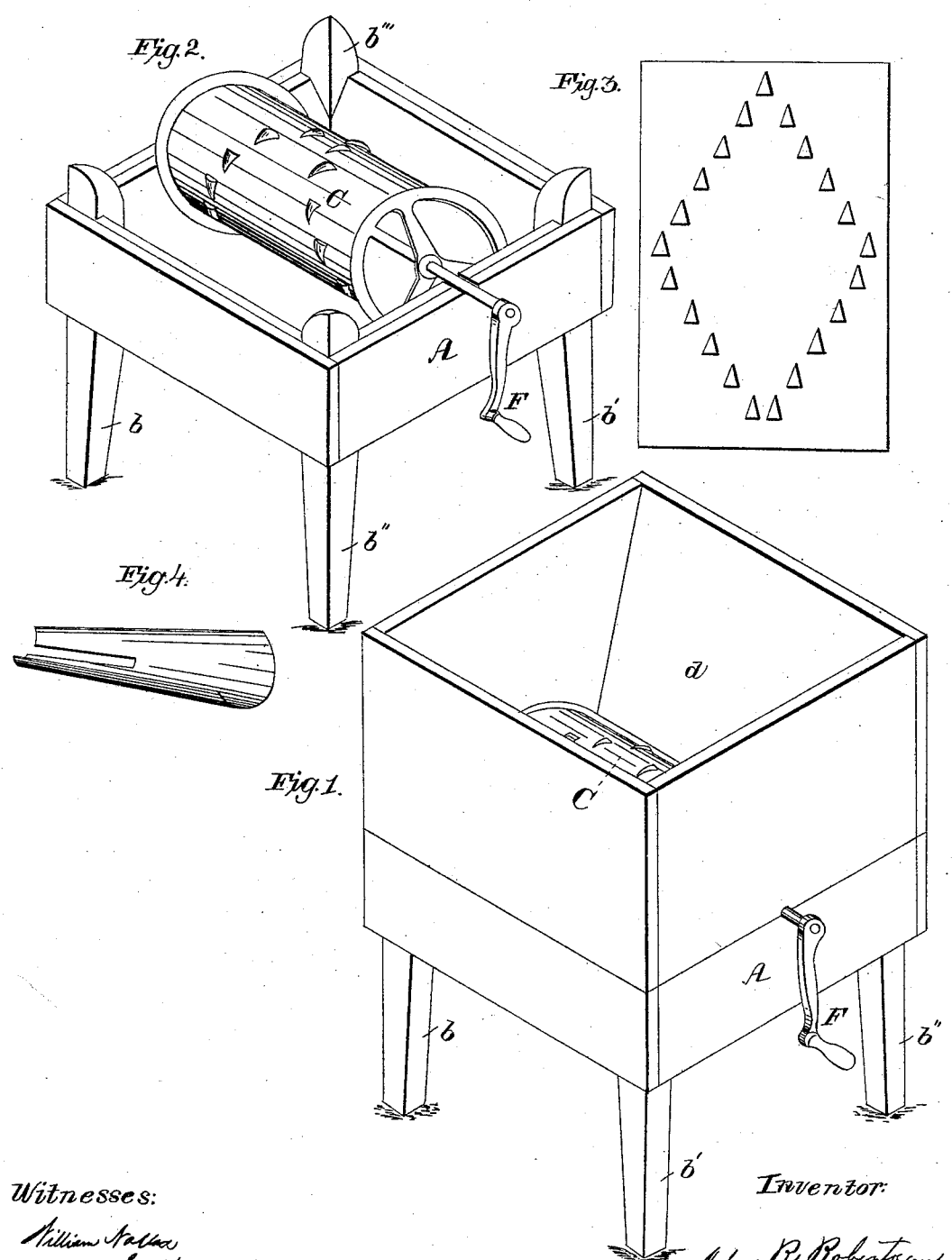

UNITED STATES PATENT OFFICE.

JOHN R. ROBERTSON, OF SYRACUSE, NEW YORK.

IMPROVEMENT IN VEGETABLE-CUTTERS.

Specification forming part of Letters Patent No. 35,839, dated July 8, 1862.

*To all whom it may concern:*

Be it known that I, JOHN R. ROBERTSON, of the city of Syracuse, State of New York, have invented certain new and useful Improvements in Machines for Cutting Vegetables; and I do hereby declare and ascertain the same as follows, reference being had to the accompanying drawings, in which—

Figure 1 represents a perspective view of my machine. Fig. 2 shows the machine with the hopper detached. Fig. 3 is a top extended view of the periphery of the cylinder, showing the peculiar arrangement of my cutters on its entire circumference.

It has become a matter of great importance to farmers that some way should be devised to cut vegetables rapidly and cheaply for feeding stock, and especially that the vegetable should be cut in such shape as to be most favorable for the stock, and while such shape avoids the possibility of choking the stock, they should be such as to enable them to eat the vegetables with the most thorough mastication. Also, if the vegetables are to be boiled or steamed before feeding, they should be cut into such shape as to best facilitate that process. Experience has established the fact that thin narrow strips present the best shape to realize all these objects, and I have therefore devised my vegetable-cutter having these objects in view.

In constructing my improved machine I form a box, A, Fig. 1, supported on standards $b\ b'\ b^2\ b^3$, and in this box I hang a cylinder, C, on the periphery of which I arrange gouge-shaped cutters in the relative order and position shown in Fig. 3. The object of this peculiar arrangement is to produce a continuous action of the cutters and uniform resistance on the crank F. On the top of the box A, I place the hopper $d$, and the cylinder C revolves by means of the crank F. The vegetables will be pressed against the side of the hopper toward which the cutters are progressing, (and which is made nearly at right angles to the face of the cutters,) and the cut matter will be forced through the cutters into the interior of the cylinder and drop out of its open ends in such thin and narrow strips as are best adapted to the purposes above named.

Having thus fully described my improved machine for cutting vegetables, what I claim therein as new, and desire to secure by Letters Patent, is—

1. The combination of the box A, hopper $d$, and cylinder C, with its cutters constructed and arranged substantially as described.

2. Leaving the ends of the cylinder open for the escape of the cut matter when said cylinder is constructed with its cutters arranged a-described, and combined with the hopper, substantially as and for the purposes set forth.

JOHN R. ROBERTSON.

Witnesses:
ANDREW J. SMITH,
M. G. HUBBARD.